United States Patent
Kern et al.

(10) Patent No.: US 8,250,909 B2
(45) Date of Patent: Aug. 28, 2012

(54) PRESSURE MEASURING DEVICE

(75) Inventors: Christoph Kern, Aspach (DE);
Reinhold Hess, Winterthur (CH); Reiko Zach, Remseck (DE); Michael Kleindl, Schwieberdingen (DE); Peter Wolfer, Kleinandelfingen (CH); Steffen Schott, Schwieberdingen (DE); Claudio Cavalloni, Regensdorf (CH); Pavlo Saltikov, Waiblingen (DE); Michael Mueller, Rickenbach-Attikon (CH); Andrea Bertola, Zürich (CH)

(73) Assignees: Robert Bosch GmbH, Stuttgart (DE);
Kistler Holding AG, Winterthur (CH)

( * ) Notice: Subject to any disclaimer, the term of this patent is extended or adjusted under 35 U.S.C. 154(b) by 373 days.

(21) Appl. No.: 12/223,939

(22) PCT Filed: Jan. 12, 2007

(86) PCT No.: PCT/EP2007/050299
§ 371 (c)(1),
(2), (4) Date: Sep. 20, 2010

(87) PCT Pub. No.: WO2007/096208
PCT Pub. Date: Aug. 30, 2007

(65) Prior Publication Data
US 2011/0005308 A1   Jan. 13, 2011

(30) Foreign Application Priority Data

Feb. 21, 2006   (DE) .......................... 10 2006 008 351

(51) Int. Cl.
*G01M 15/08*   (2006.01)

(52) U.S. Cl. .................................. 73/114.16; 73/114.19
(58) Field of Classification Search ................. 73/35.12, 73/35.13, 114.16, 114.19, 114.21
See application file for complete search history.

(56) References Cited

U.S. PATENT DOCUMENTS

| | | | | |
|---|---|---|---|---|
| 6,411,038 B2* | 6/2002 | Murai et al. | ...................... | 315/55 |
| 6,539,787 B1* | 4/2003 | Murai et al. | ............... | 73/114.21 |
| 7,032,438 B2* | 4/2006 | Heinzelmann et al. | ..... | 73/114.21 |
| 7,185,621 B2* | 3/2007 | Yamada et al. | ........... | 123/145 A |
| 7,228,730 B2* | 6/2007 | Haussner et al. | .......... | 73/114.19 |
| 7,581,520 B2* | 9/2009 | Kern et al. | ................ | 123/145 A |
| 8,074,502 B2* | 12/2011 | Mueller et al. | ............. | 73/114.19 |
| 2001/0015402 A1* | 8/2001 | Murai et al. | ................... | 248/554 |
| 2003/0177839 A1 | 9/2003 | Tsukada et al. | | |
| 2005/0252297 A1* | 11/2005 | Heinzelmann et al. | ......... | 73/708 |
| 2006/0032472 A1* | 2/2006 | Yamada et al. | ........... | 123/145 A |

FOREIGN PATENT DOCUMENTS

| | | |
|---|---|---|
| DE | 656 168 | 1/1938 |
| DE | 38 11 311 | 3/1989 |
| DE | 41 18 824 | 12/1991 |
| DE | 103 43 521 | 4/2005 |
| DE | 103 46 330 | 5/2005 |
| DE | 10 2006 008 351 | 8/2007 |

(Continued)

*Primary Examiner* — Freddie Kirkland, III
(74) *Attorney, Agent, or Firm* — Kenyon & Kenyon LLP

(57) ABSTRACT

A pressure measuring device suitable for disposition in a chamber of an internal combustion engine. The pressure measuring device has a housing, a force transmitting element that is effectively connected to a pressure sensor, and a sensor cage that surrounds the pressure sensor. The sensor cage is connected to the housing by a circumferential weld seam only at one connection segment of the housing. In this way, it is possible to achieve a defined pre-tensioning of a metal diaphragm that is connected on the one hand to the sensor cage and on the other hand to the force transmitting element.

9 Claims, 2 Drawing Sheets

FOREIGN PATENT DOCUMENTS

| | | |
|---|---|---|
| EP | 0 637 736 | 8/1994 |
| EP | 1 134 385 | 9/2001 |
| EP | 1 517 086 | 3/2005 |
| EP | 1 598 651 | 11/2005 |
| EP | 1 624 249 | 2/2006 |
| FR | 2 869 391 | 10/2005 |
| JP | 2-33337 | 3/1990 |
| JP | 2-81441 | 6/1990 |
| JP | 2005-227001 | 8/2005 |
| JP | 2006-10306 | 1/2006 |
| JP | 2009-527749 | 7/2009 |
| WO | WO 92/01915 | 2/1992 |

\* cited by examiner

PRESSURE MEASURING DEVICE

FIELD OF THE INVENTION

The present invention relates to a pressure measuring device for disposition in a chamber of an internal combustion engine. Specifically, the present invention relates to a pressure measuring glow plug for disposition in a pre-chamber, turbulence chamber, or combustion chamber of an air-compressing self-igniting internal combustion engine.

BACKGROUND INFORMATION

German Patent Application No. DE 103 43 521 describes a pressure measuring glow plug for a diesel engine. The known pressure measuring glow plug has a plug body that is to be placed into a cylinder of the diesel engine. Moreover, the known pressure measuring glow plug has a heating rod situated in the plug body and a pressure sensor that is situated between the heating rod and the plug body. The pressure sensor is influenced by the pressure transmitted by the heating rod in the combustion chamber of the cylinder. Moreover, the known pressure measuring glow plug has a diaphragm that is connected on the one hand to the plug body and on the other hand to the heating rod in order to seal the pressure sensor relative to the combustion chamber.

The pressure measuring glow plug described in German Patent Application No. DE 103 43 521 has the disadvantage that when the pressure measuring glow plug is installed in the cylinder, the assembly forces place a high degree of mechanical stress on the diaphragm.

SUMMARY OF THE INVENTION

The pressure measuring device according to the present invention has the advantage that the force path for measuring the pressure prevailing in the chamber is decoupled from the housing of the pressure measuring device, so that a better measurement of the pressure by the pressure sensor is enabled.

The sensor cage can be connected to the housing directly via a connection, in particular a welded connection, at the connecting segment of the housing. In addition, the sensor cage can be connected indirectly to the housing by connecting the sensor cage to the fixing element and connecting the fixing element to the housing via a connection, in particular a welded connection, at the connecting segment of the housing. This provides the advantage that a modular construction of the pressure measuring device is possible. In particular, the sensor cage with the fixing element, the pressure sensor, and, if necessary, additional elements connected to the sensor cage, can be pre-assembled, so that during the installation of the pressure measuring device it is then necessary only to connect the sensor cage or fixing element to the housing by a weld seam or the like.

Advantageously, a spring-elastic element is provided that is situated inside the housing and that is connected on the one hand at least indirectly to the force transmitting element and on the other hand is connected at least indirectly to the sensor cage. In this way, no connection of the spring-elastic element to the housing is required, so that a certain pre-tensioning of the spring-elastic element can be specified. In particular, tensioning of the spring-elastic element due to the assembly tension that occurs during installation of the pressure measuring device in a cylinder head or the like is avoided. In addition, tensions that occur during the operation of the internal combustion engine in the housing of the pressure measuring device are not transmitted to the spring-elastic element or to other elements in the force path between the force transmitting element and the pressure sensor, so that a high degree of reliability of the pressure measuring device is ensured.

The defined pre-tension of the spring-elastic element can be specified for example during the connection of the fixing element to the sensor cage. This has the advantage that a defined pre-tension can be set already before final assembly. In addition, the pre-tension can be set to the desired value already during the connection of the fixing element to the sensor cage, without having to take into account the axial forces that occur during the installation of the pressure measuring device, because these forces do not influence the pre-tensioning of the spring-elastic element. The spring-elastic element can be fashioned for example as a metal diaphragm.

Advantageously, a coefficient of thermal expansion of a material of the fixing element is selected such that there takes place a compensation of expansion differences between the components of the pressure measuring device, in particular of the sensor cage and of the pressure sensor.

DETAILED DESCRIPTION

Figure 1:
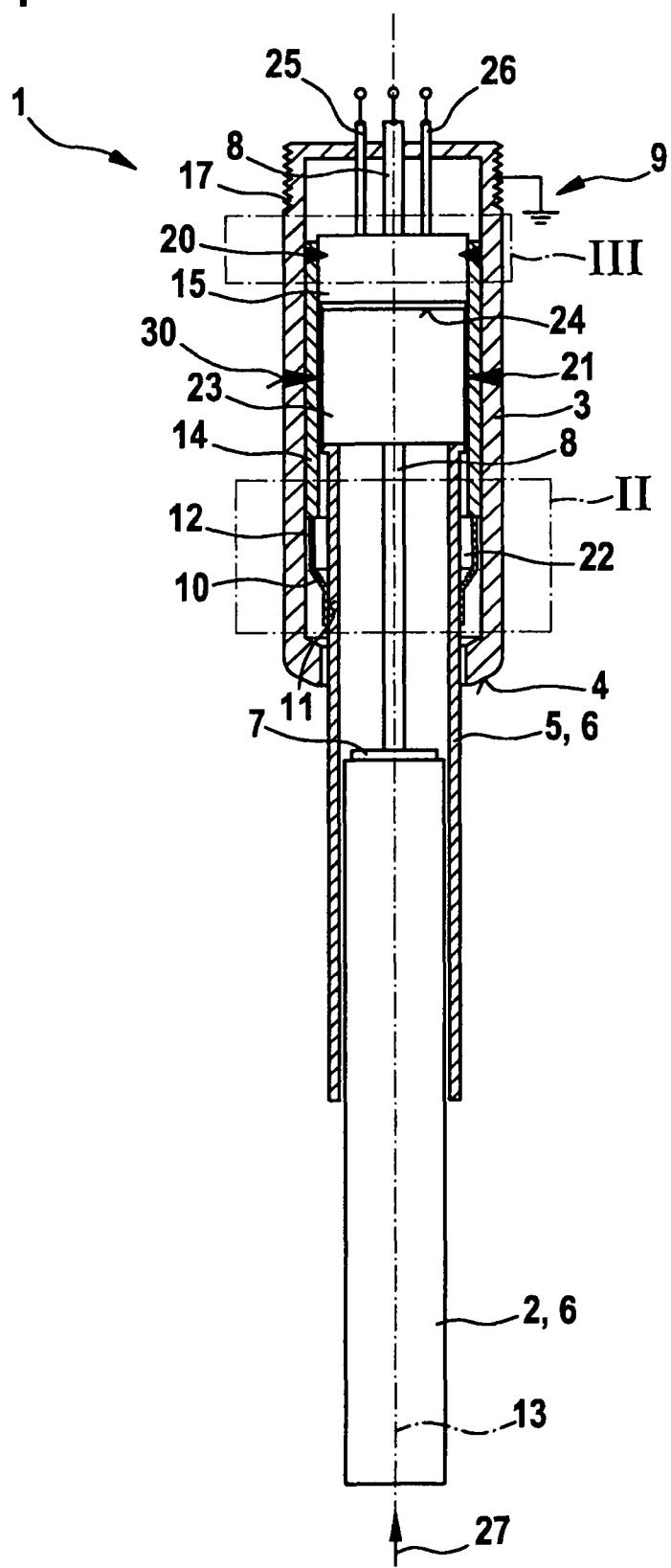
FIG. 1 shows a first exemplary embodiment of a pressure measuring device according to the present invention in a schematic sectional view.

FIG. 1 shows a first exemplary embodiment of a pressure measuring device 1 in an axial sectional representation. Here, pressure measuring device 1 is fashioned as a pressure measuring glow plug 1 for an air-compressing, self-igniting internal combustion engine. In pre-chamber and turbulence chamber engines, a rod-shaped heating element 2 of pressure measuring glow plug 1 extends into the chamber of the internal combustion engine, and in engines having direct injection it extends into a combustion chamber of the engine. However, pressure measuring glow plug 1 according to the present invention is also suitable for other cases of application. In addition, pressure measuring device 1 can also be fashioned as a pressure measuring spark plug or pressure measuring injection valve for mixture-compressing, externally ignited internal combustion engines.

Pressure measuring glow plug 1 has a housing 3 on which a sealing cone 4 is fashioned. Rod-shaped heating element 2 is surrounded in sections by a force transmitting element 5 and is connected thereto. Rod-shaped heating element 2 forms, together with force transmitting element 5, a heating body 6 of pressure measuring glow plug 1. The electrical contacting of rod-shaped heating element 2 of heating body 6 takes place at a contact element 7 that is connected to rod-shaped heating element 2, by an electrical line 8 that is connected to a control device in a suitable manner. In addition, force transmitting element 5 of heating body 6 is connected electrically to housing 3 directly or indirectly, creating a connection to electrical ground 9 via housing 3.

Inside housing 3, there is provided a spring-elastic element 10 that in the depicted exemplary embodiment is fashioned as a metal diaphragm 10. Metal diaphragm 10 is connected at a connection segment 11 to force transmitting element 5, the inner diameter of metal diaphragm 10 at connecting segment 11 being matched to the outer diameter of force transmitting element 5. In addition, metal diaphragm 10 has a segment 12 at which metal diaphragm 10 has a diameter that is enlarged relative to connecting segment 11. This construction of metal diaphragm 10 makes possible a pre-tensioning of metal diaphragm 10 in the axial direction, i.e., in the direction of an axis 13 of pressure measuring glow plug 1. Metal diaphragm 10 is connected at segment 12 to a sensor cage 14 that can be sleeve-shaped or tube-shaped. In addition, a fixing element 15 is provided that is connected, at an end of sensor cage 14 situated opposite metal diaphragm 10, to sensor cage 14 by a connection 20 realized as a welded connection 20, i.e. a weld seam 20. Weld seam 20 preferably runs continuously in a circumferential direction relative to axis 13. Moreover, sensor cage 14 is connected to housing 3 of pressure measuring glow plug 1 by a connection 21 that is realized as a welded connection 21, i.e. a weld seam 21. Through the connection of metal diaphragm 10 to force transmitting element 5, the connection of metal diaphragm 10 to sensor cage 14, and the connection of sensor cage 14 to housing 3 by welded connection 21, an interior space 22 of housing 3 is sealed relative to the chamber of the internal combustion engine. Interior space 22 then represents a part of a concentric bore of housing 3.

A part of internal chamber 22 is formed by an interior space of sensor cage 14. Inside sensor cage 14, there is situated a pressure sensor 23 that is supported on an end surface 24 of fixing element 15. Opposite end surface 24, pressure sensor 23 is effectively connected to force transmitting element 5; in the depicted exemplary embodiment, force transmitting element 5 is immediately adjacent to pressure sensor 23. When pressure sensor 23 is charged by force transmitting element 5, a e.g. piezoelectric part of pressure sensor 23 produces a measurement charge that can be measured via suitable measurement lines 25, 26 that lead from housing 3 to a suitable evaluation circuit.

Via a pressure prevailing in the chamber of the internal combustion engine, rod-shaped heating element 2 of heating body 6 is charged in an axial direction 27, i.e. in the direction of axis 13 of housing 3. The force acting on heating element 2 is transmitted essentially to force transmitting element 5 of heating body 6. Via force transmitting element 5, this force is transmitted to pressure sensor 23, so that dependent on the pressure in the combustion chamber, a certain electrical charge of pressure sensor 23 is capable of being measured via measurement lines 25, 26.

Fixing element 15 is connected to sensor cage 14 via welded connection 20 in such a way that a certain pre-tensioning of metal diaphragm 10 is provided in the pressureless state. Through this pre-tensioning, on the one hand the load on metal diaphragm 10 caused by the combustion chamber pressure can be reduced in order to increase the life span of metal diaphragm 10. On the other hand, the pre-tensioning of metal diaphragm 10 causes the individual components in the force path, i.e. in particular metal diaphragm 10, sensor cage 14, fixing element 15, pressure sensor 23, and force transmitting element 5, to be fitted to one another in such a way that hysteresis effects are prevented or at least reduced during the pressure measurement.

Sensor cage 14 is connected to housing 3 at a single connecting segment 30 of housing 3. Connecting segment 30 is approximately line-shaped in the circumferential direction, and its disposition corresponds to the position of weld seam 21. In the axial direction 27, i.e. along axis 13, only connecting segment 30 is provided for connecting sensor cage 14 to housing 3, so that relative to axis 13 a one-point connection is defined between sensor cage 14 and housing 3. Changes in length of housing 3 and of the cylinder head, which as a rule have different coefficients of thermal expansion, or tensions occurring within housing 3 that can occur for example during operation of the internal combustion engine due to heating of housing 3 from sealing cone 4, and of the cylinder head, are thus not transmitted to the components of the force path for the measurement of the pressure in the chamber, these components comprising in particular force transmitting element 5, metal diaphragm 10, sensor cage 14, fixing element 15, pressure sensor 23, and possibly other elements that are not shown.

Housing 3 has a threading 17 in order to enable glow plug 1 to be installed. Due to the one-point connection between sensor cage 14 and housing 3, a charging of housing 3 with an assembly tension during installation then also does not have any effect on the components of the force path for measuring the pressure in the chamber.

Because the region of loading of metal diaphragm 10 by the pre-tensioning of metal diaphragm 10 and by the pressure in the chamber of the internal combustion engine is determined ahead of time, an optimized construction of metal diaphragm 10 is possible, so that a flexible, in particular thin and therefore elastic, design of metal diaphragm 10 is possible, making possible a precise measurement of the pressure. Here, the region of the loading of metal diaphragm 10 and thus of the measurement region can also be enlarged, because the pre-tensioning of metal diaphragm 10 counteracts the pressure in the chamber. A cyclical deformation of the cylinder head wall that occurs at the high combustion pressures caused during engine operation will cause a deformation of housing 3 of pressure measuring glow plug 1, but this deformation is not transmitted to metal diaphragm 10 due to the one-point connection.

Sensor cage 14 and pressure sensor 23 can in particular be made of materials having different expansion behavior. The expansion differences caused thereby are preferably thermally compensated by a suitable choice of the material or materials of fixing element 15. Here, compensation is possible through the choice of the axial length, i.e. the axial extension along axis 13, of fixing element 15. Standardly, pressure sensor 23 has a relatively low thermal expansion, so that the material of fixing element 15 is preferably made of a material having a coefficient of thermal expansion that is greater than a coefficient of thermal expansion of sensor cage 14.

Figure 2:
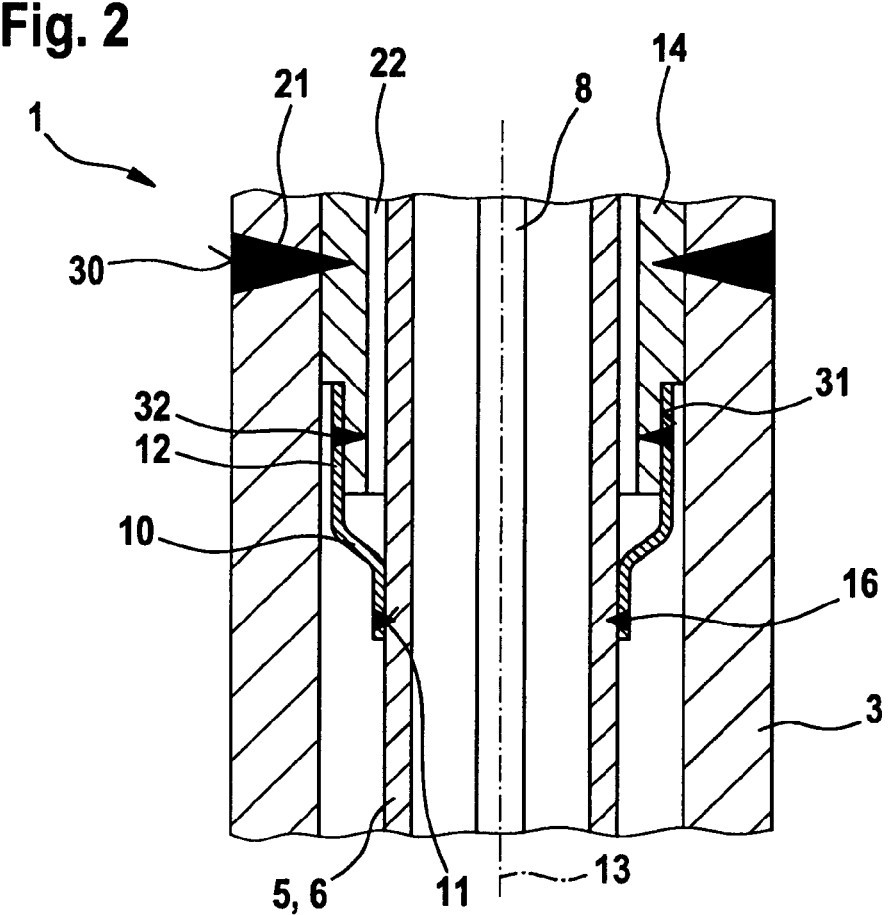
FIG. 2 shows the section designated II in FIG. 1 of the pressure measuring device according to a second exemplary embodiment of the present invention.

FIG. 2 shows a segment of a pressure measuring glow plug 1 designated II in FIG. 1 according to a second exemplary embodiment of the present invention. In this and all other Figures, corresponding elements have been provided with identical reference characters, so that repeated description is not necessary.

In this exemplary embodiment, sensor cage 14 is connected directly to housing 3 at connecting segment 30 by a circumferential weld seam 21, corresponding to the exemplary embodiment shown in FIG. 1. In addition, sensor cage 14 has, on the side of metal diaphragm 10, an annular recess 31 that enables metal diaphragm 10 to be plugged with its segment 12 onto sensor cage 14. This forms a reliable connection between sensor cage 14 and metal diaphragm 10. This connection is further improved by a circumferential weld seam 32 that connects segment 12 of metal diaphragm 10 to sensor cage 14. In addition, metal diaphragm 10 is connected at its connecting segment 11 to force transmitting element 5 by a weld seam 16.

Figure 3:
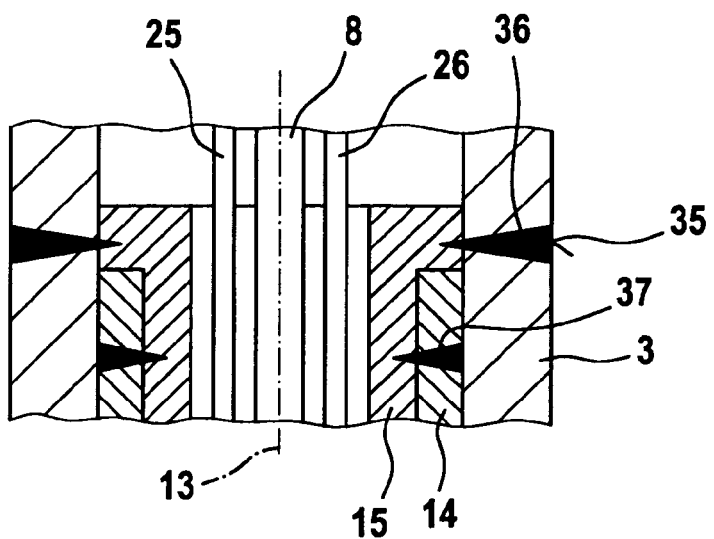
FIG. 3 shows the section designated III in FIG. 1 of a pressure measuring device according to the present invention, according to a third exemplary embodiment.

FIG. 3 shows the segment designated III in FIG. 1 of a pressure measuring glow plug 1 according to a third exemplary embodiment of the present invention. In this exemplary embodiment, housing 3 has a connecting segment 35 at which housing 3 is connected to fixing element 15 by a connection 36 realized as a welded connection 36, i.e. weld seam 36. Here, weld seam 36 is fashioned as a circumferential weld seam 36. In this case, an additional welded connection 21 between housing 3 and sensor cage 14 at a connection segment 30, as shown in FIG. 1, is omitted. Thus, in this case there is only connecting segment 35 at which housing 3 is connected to fixing element 15; no additional direct mechanical connection is provided between housing 3 and sensor cage 14.

Sensor cage 14 is connected to fixing element 15 by a connection 37 fashioned as a welded connection 37, i.e. a circumferential weld seam 37, so that via fixing element 15 an indirect connection of sensor cage 14 to housing 3 is fashioned.

It is to be noted that the exemplary embodiments shown in FIGS. 2 and 3 can unproblematically be combined with one another.

The present invention is not limited to the described exemplary embodiments.

What is claimed is:

1. A pressure measuring device for disposition in a chamber of an internal combustion engine, comprising:
    a housing;
    a force transmitting element that extends partially out of the housing;
    a fixing element;
    a pressure sensor situated in an internal space of the housing, the pressure sensor being, on the one hand, effectively connected at least indirectly to the force transmitting element in order to acquire a charging of the force transmitting element resulting from a pressure prevailing in the chamber in order to determine the pressure prevailing in the chamber, and the pressure sensor being, on the other hand, at least indirectly supported on the fixing element;
    a sensor cage connected on the one hand at least indirectly to the force transmitting element and on the other hand connected at least indirectly to the fixing element, wherein the sensor cage is connected to the housing at least indirectly, at a connecting segment of the housing; and
    a spring-elastic element situated inside the housing and connected on the one hand at least indirectly to the force transmitting element and on the other hand connected at least indirectly to the sensor cage,
    wherein the fixing element has, for a compensation of expansion differences of components of the pressure measuring device, a thermal expansion that is matched to at least a thermal expansion of the sensor cage.

2. The pressure measuring device according to claim 1, wherein the device is a pressure measuring glow plug for an air-compressing, self-igniting internal combustion engine.

3. The pressure measuring device according to claim 1, wherein the sensor cage is connected to the housing at the connecting segment of the housing by a welded connection.

4. The pressure measuring device according to claim 1, wherein the sensor cage is connected to the fixing element, and wherein the fixing element is connected to the housing at the connecting segment of the housing by a welded connection.

5. The pressure measuring device according to claim 1, wherein the fixing element and the sensor cage are connected to one another in such a way that the spring-elastic element is charged with a predetermined pre-tension force.

6. The pressure measuring device according to claim 1, wherein the spring-elastic element includes a metal diaphragm.

7. The pressure measuring device according to claim 1, wherein the force transmitting element is a rod-shaped force transmitting element.

8. The pressure measuring device according to claim 1, wherein the sensor cage is a sleeve-shaped sensor cage.

9. The pressure measuring device according to claim 1, wherein the fixing element is composed at least substantially of a material having a coefficient of thermal expansion that is greater than a coefficient of thermal expansion of a material of which the sensor cage is at least substantially composed.

* * * * *